United States Patent [19]
Hutchison et al.

[11] 4,441,735
[45] Apr. 10, 1984

[54] STEERING GEAR ASSEMBLY FOR A LAWN AND GARDEN TRACTOR

[75] Inventors: Wayne R. Hutchison, Mayville; David L. Apple, Horicon, both of Wis.

[73] Assignee: Deere & Company, Moline, Ill.

[21] Appl. No.: 349,796

[22] Filed: Feb. 18, 1982

[51] Int. Cl.³ ............................................. B62D 7/10
[52] U.S. Cl. ..................................... 280/771; 280/96; 74/89.13; 74/498
[58] Field of Search .................... 280/771, 773, 96; 180/149; 74/89.13, 98, 416, 417, 409, 498, 400, 410, 396

[56] References Cited
U.S. PATENT DOCUMENTS

| | | | |
|---|---|---|---|
| 1,350,285 | 8/1920 | Weigel | 280/771 |
| 2,911,229 | 11/1959 | Strehlow | 280/96 |
| 3,449,981 | 6/1969 | Price | 74/400 |
| 3,758,130 | 9/1973 | Mead | 280/96 |

Primary Examiner—Robert R. Song

[57] ABSTRACT

A lawn and garden tractor includes an inclined steering input shaft and a vertical steering output shaft which are both journalled for oscillation in a support plate and which converge downwardly. Respectively axially shiftably keyed or splined on the input and output shafts at respective desired working positions just below the support plate are a straight bevel gear and a gear sector. The gear and gear sector are biased to their desired working positions by a pair of coil springs.

4 Claims, 4 Drawing Figures

STEERING GEAR ASSEMBLY FOR A LAWN AND GARDEN TRACTOR

BACKGROUND OF THE INVENTION

The present invention relates to steering systems for lawn and garden tractors and more specifically relates to steering systems having input and output steering shafts mounted for oscillating about converging axes and respectively carrying bevel gears which are meshed with each other.

It is known in the prior art to provide steering systems of the above-noted type wherein the gearing is open, i.e., it is not enclosed in a case and only a single support plate is provided in the vicinity of the gears for maintaining proper positioning of the input and output shafts relative to each other. In this known design, the gears are pinned to their respective shaft, however, tolerances and wear result in the gears moving downwardly on their respective shafts from their intended operating positions which, by virtue of the convergence of the shafts, results in the teeth of the gears becoming wedged or jammed together such that they bind when a steering load is applied.

SUMMARY OF THE INVENTION

According to the present invention, there is provided an improved gear assembly for a steering system of a type having downwardly converging input and output steering shafts respectively carrying straight bevel gears which are meshed together.

The steering system of the present invention includes downwardly converging input and output steering shafts journalled in a single support plate which is fixed to the vehicle frame. A straight bevel gear is non-rotatably and axially shiftably mounted on the lower end of the input shaft at a location below the support plate, and a bevel gear sector is similarly mounted on the output shaft. A first pair of cotter keys respectively prevents downward movement of the gear and gear sector on their respective shafts. A pair of compression springs are respectively received on the input and output shafts so as to be above the support plate, the pair of compression springs respectively being compressed between a second pair of cotter keys carried by the input and output shafts and the plate. Thus, the springs act to exert an upward bias on the input and output shafts so as to maintain the gear and gear sector in a desired operating position against the support plate.

In an alternate embodiment, the pair of compression springs are located below the gear and gear sector and act directly thereagainst.

A broad object of the invention, which is accomplished by the aforedescribed steering gear assembly, is to provide a simple, economical assembly wherein the gearing is maintained in proper meshed engagement.

A more specific object is to provide a steering gear assembly wherein the steering input and output shafts respectively have gears mounted thereon such that they are continually maintained in desired operating position by means of respective biasing springs.

These and other objects will become apparent from a reading of the ensuing description together with the appended drawings.

DESCRIPTION OF THE PREFERRED EMBODIMENT

Figure 1:
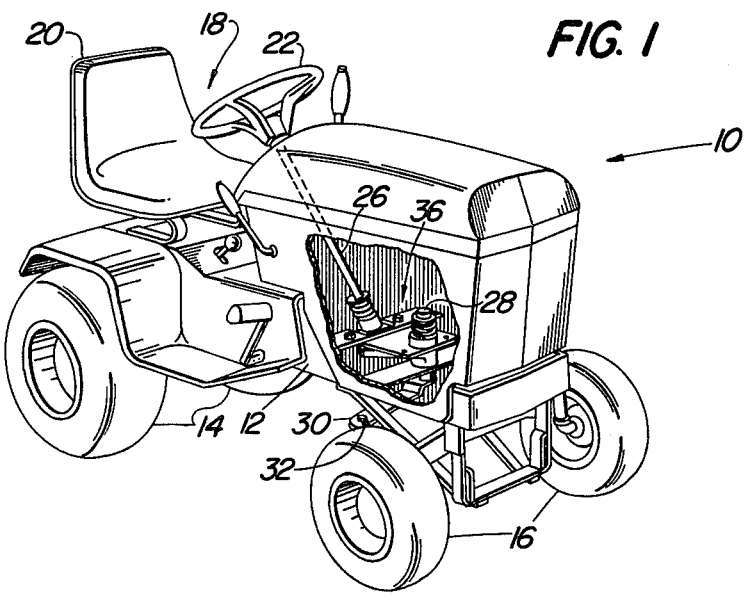
FIG. 1 is a right front perspective view of a lawn and garden tractor with parts broken away to expose the steering mechanism.

Referring now to FIG. 1, therein is shown a lawn and garden tractor indicated in its entirety by the reference numeral 10. The tractor 10 includes a main frame 12 supported on a pair of rear drive wheels 14 and on a pair of front steerable wheels 16. Generally indicated at 18 is an operator's station including a seat 20 mounted at the rear of the tractor between the drive wheels 14. Located forwardly of the seat 20 so as to be in easy reach of a seated operator is a steering wheel 22. The steering wheel 22 is fixed to the top of an inclined steering input shaft 26 which is connected by bevel gearing for controlling movement of a vertical steering output shaft 28 having a steering arm 30 fixed to the lower end thereof. The arm 30 is connected, as by a rod 32, to conventional steering linkage (not shown) coupled between the front wheels 16.

Figure 2:
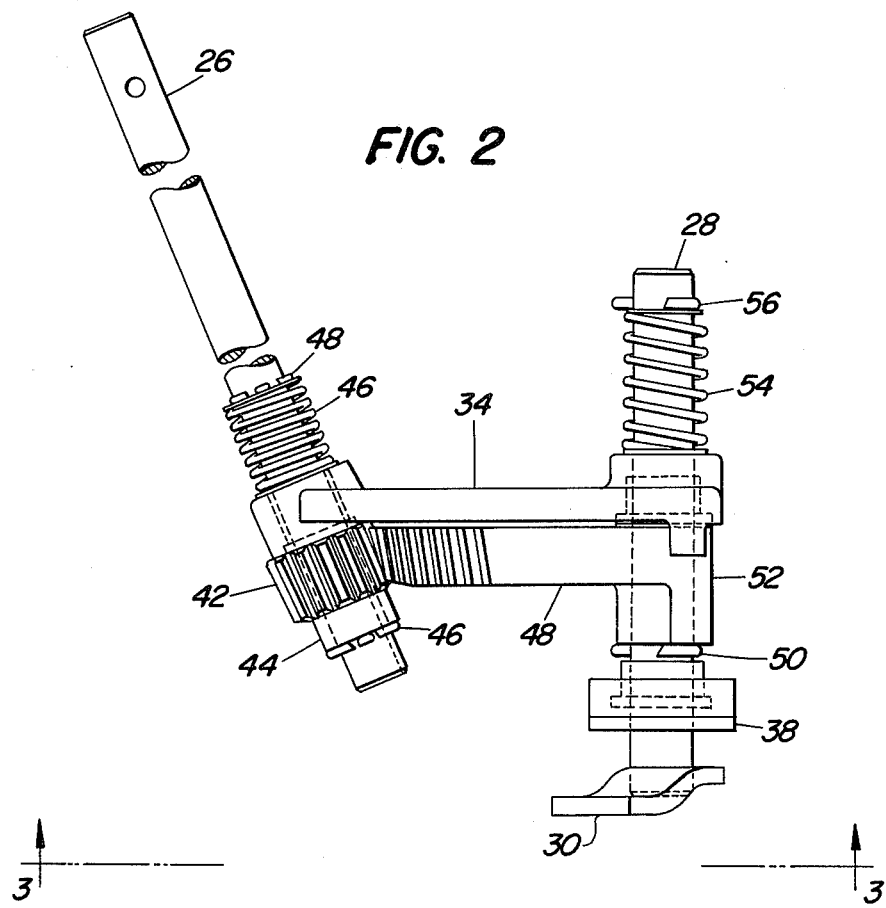
FIG. 2 is a right side elevational view of that part of the steering control mechanism embodying the present invention.
Figure 3:
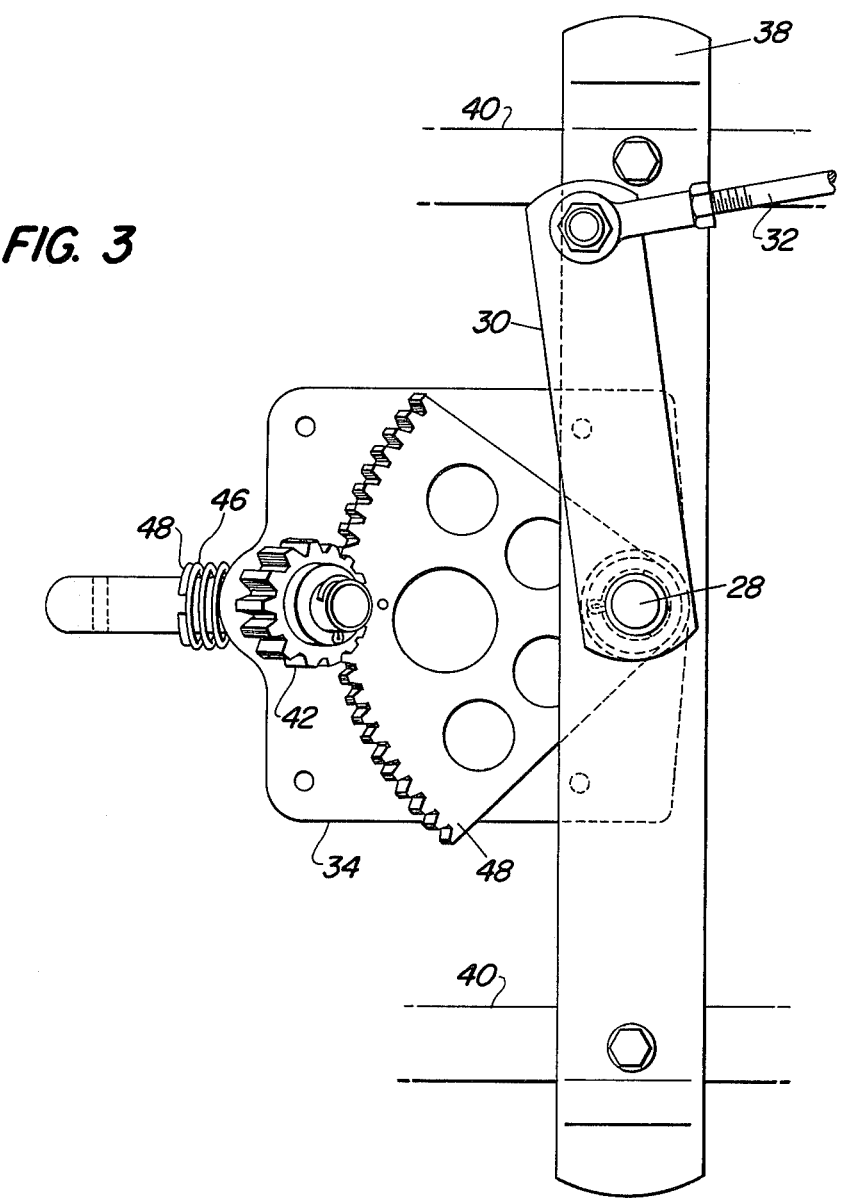
FIG. 3 is a bottom view of the mechanism illustrated in FIG. 2 but additionally including a portion of the main frame of the tractor.

Referring now to FIGS. 2 and 3, it can be seen that the steering input and output shafts 26 and 28, respectively, are journalled for oscillation in a generally rectangular, horizontally disposed shaft support plate 34. The plate 34 may be secured to the main frame of the tractor in any well-known fashion, which may include bracketry and fasteners, as partly shown at 36 in FIG. 1. The output shaft 28 is additionally journalled in and supported by a cross bar 38 spaced below the plate and having opposite ends secured to spaced, parallel members 40 forming part of the main frame 12.

Axially slidably keyed or splined on the input shaft 26 at a location just below the plate 34 is a straight bevel gear 42 having a downwardly extending hub 44 resting on a cotter key 46 carried by the shaft 26. The gear 42 is biased upwardly to a desired working position against the plate 34 by a coil compression spring 46 received on the shaft 26 above the plate 34 and having its opposite ends engaged with the plate 34 and a cotter key 48 carried by the shaft 26.

A bevel gear sector 48 is axially slidably keyed or splined on the output shaft 28 at a location between the support plate 34 and the cross bar 38. A cotter key 50 is carried by the shaft 28 at a location below the gear sector 48 and a hub 52 of the sector rests on the cotter key. Provided for biasing the gear sector 48 upwardly into a desired working position against the plate wherein the sector is properly meshed with the gear 42 is a coil compression spring 54. The spring 54 is received on an upper end portion of the output shaft 28 and is compressed between the plate 34 and a cotter key 56 carried by the shaft 28.

It will be appreciated then that the springs 46 and 54 respectively act to maintain the gear 42 and the gear sector 48 in their respective desired working positions wherein they are properly spaced one from the other so as to mesh for smooth operation during steering.

It is here noted that satisfactory operation will result if only one of the gear 42 and gear sector 48 is spring biased into its desired working position. In this case, the one of the gear and gear sector which is not biased would be pinned to the shaft on which it is mounted. While tolerances and/or wear may result in the pinned gear or sector moving downwardly, the movement normally would not be significant enough to adversely affect the proper meshing of the gear and gear sector.

Figure 4:
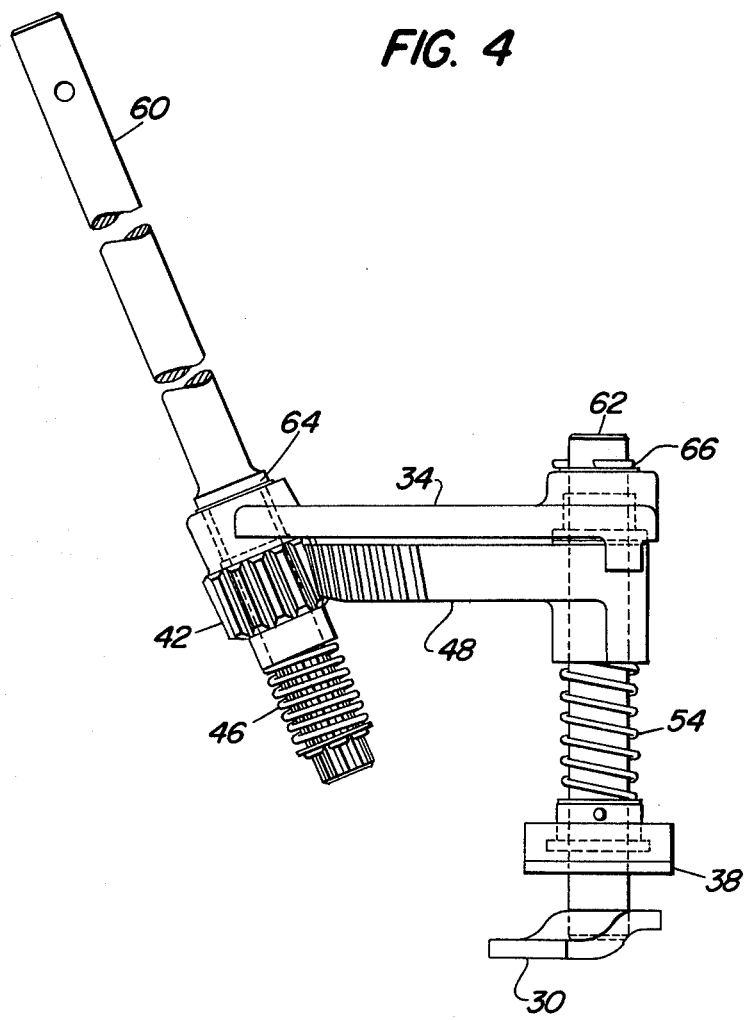
FIG. 4 shows an alternate embodiment of the steering mechanism.

Referring now to FIG. 4, therein is shown an alternate embodiment of the invention wherein like parts are given like reference numerals. Specifically, a steering input shaft 60 and a steering output shaft 62 are each journalled in the support plate 34 for oscillation during steering operation. The input shaft 60 is kept from sliding downwardly through the plate 34 by a shoulder 64 while a cotter key 66 carried by the upper end of the output shaft 62 keeps the latter from sliding downwardly. The input gear 42 and the gear sector 48 are respectively axially slidably keyed or splined on the shafts 60 and 62 at respective locations below the plate 34. The coil compression spring 46 is received on the lower end portion of the input shaft 60 and is compressed between the gear 42 and a cotter key 64 carried at the lower end of the shaft 60. The coil compression spring 54 is received on the output shaft 62 and is compressed between the gear sector 48 and the cross bar 38.

We claim:

1. A vehicle steering system, comprising: a support means; a steering input shaft and a steering output shaft each being journalled for oscillation in the support means about respective axes which converge downwardly toward each other; first and second intermeshed straight bevel gears respectively mounted on said input and output shafts for oscillation therewith; said intermeshed straight bevel gears having respective desired operational positions located against said support means; and biasing means acting on at least one of the first and second bevel gears and biasing it to its respective desired operational position.

2. The steering system defined in claim 1 wherein the first and second level gears are located below the support means.

3. The steering system defined in claim 2 wherein said input and output shafts are respectively provided with first and second stop means located beneath and in supporting relationship to the first and second bevel gears; said input and output shafts further being provided with third and fourth stop means, respectively, spaced above the support means; and said biasing means including first and second coil compression springs respectively located on the input and output shafts between the third and fourth stop means and the support frame means.

4. The steering system defined in claim 2 wherein said input and output shafts are respectively provided with first and and second stop means located for preventing the input and output shafts from slipping downwardly relative to the support means; third and fourth stop means respectively provided on the input and output shafts at respective locations spaced downwardly from the first and second bevel gears; and said biasing means including first and second compression springs located between the third and fourth stop means and the first and second bevel gears, respectively.

* * * * *